United States Patent
Matejka et al.

(10) Patent No.: US 9,736,526 B2
(45) Date of Patent: Aug. 15, 2017

(54) REAL-TIME SCRUBBING OF VIDEOS USING A TWO-DIMENSIONAL GRID OF THUMBNAIL IMAGES

(71) Applicant: Autodesk, Inc., San Rafael, CA (US)

(72) Inventors: Justin Frank Matejka, Newmarket (CA); Tovi Grossman, Toronto (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 759 days.

(21) Appl. No.: 13/860,412

(22) Filed: Apr. 10, 2013

(65) Prior Publication Data

US 2014/0310601 A1 Oct. 16, 2014

(51) Int. Cl.
*G06F 3/0485* (2013.01)
*H04N 21/431* (2011.01)
*H04N 21/472* (2011.01)
*H04N 21/81* (2011.01)

(52) U.S. Cl.
CPC ... *H04N 21/4314* (2013.01); *H04N 21/47217* (2013.01); *H04N 21/8153* (2013.01)

(58) Field of Classification Search
CPC .................................................. G06F 3/0485
USPC ....................................................... 715/720
See application file for complete search history.

(56) References Cited

U.S. PATENT DOCUMENTS

| 5,404,316 A | * | 4/1995 | Klingler | G06F 17/30017 |
| | | | | 345/418 |
| 2009/0100339 A1 | * | 4/2009 | Wharton-Ali et al. | 715/720 |
| 2009/0222765 A1 | * | 9/2009 | Ekstrand | G06F 3/0485 |
| | | | | 715/818 |
| 2009/0278916 A1 | * | 11/2009 | Ito | 348/51 |
| 2011/0119620 A1 | * | 5/2011 | Schon et al. | 715/785 |

* cited by examiner

*Primary Examiner* — Andrea Leggett
(74) *Attorney, Agent, or Firm* — Artegis Law Group, LLP (57) ABSTRACT

A computer-implemented method for traversing a video file includes populating a two-dimensional array with representative images corresponding to a portion of the video and causing the two-dimensional array to be displayed. The two-dimensional array includes a location indicator configured to traverse the two-dimensional array in a direction parallel with one dimension of the two-dimensional array in response to navigation information associated with the portion of the video. The location indicator is further configured to indicate a position in the video by highlighting one of the representative images populating the two-dimensional array. Because an end-user is provided with a large set of statically displayed representative images during navigation of a video timeline, the end-user can visually identify a desired target scene, even when traversing a the timeline relatively quickly.

21 Claims, 11 Drawing Sheets

REAL-TIME SCRUBBING OF VIDEOS USING A TWO-DIMENSIONAL GRID OF THUMBNAIL IMAGES

BACKGROUND OF THE INVENTION

Field of the Invention

The present invention relates generally to video playback and, more specifically, to real-time scrubbing of videos using a two-dimensional grid of thumbnail images.

Description of the Related Art

Manually searching for a specific location in a digital video file by "scrubbing," i.e., by moving a cursor along a timeline slider associated with the video, can be performed fairly conveniently with a downloaded video. This is because the current selected frame of the downloaded video can generally be accessed and displayed almost immediately after the cursor is positioned at any point on the timeline slider. This allows a viewer to quickly determine what portion of the video corresponds to the current cursor position and whether the cursor should be repositioned to find the target location in the video. However, due to the long wait time associated with downloading longer videos before viewing of the video can begin, video streaming has become a popular alternative to video downloading.

Streaming video, in which audio-visual media are constantly received and presented to an end-user while being delivered by a provider, allows viewing to begin after a relatively short period of data buffering has taken place. This is because the bulk of the downloading process takes place while the video is being presented to the end-user. However, in contrast to downloaded videos, which are fully cached, searching for a specific location in a streaming video can be problematic. Specifically, when an end-user searches for a specific location in a streaming video by scrubbing a cursor position forward or backward along a timeline associated with the video, the end-user must wait for the data buffering process to complete before the portion of the video corresponding to the current cursor location is displayed. This is because streaming video players are generally unable to display video frames until a certain level of buffering has taken place. Unfortunately, such display latency occurs each time the cursor is repositioned, even if the cursor is only repositioned a very short distance along the video time line. Because the cursor is generally repositioned many times in the course of navigating to a target location in a video, even when the requisite data buffering takes as little as a few seconds, navigation performance is significantly degraded. Thus, such display latency can make the video scrubbing experience for the end-user very choppy, time-consuming, and frustrating.

Recent techniques to improve real-time seeking in a streaming video include displaying one or more pre-cached thumbnail images during seeking that correspond to the current seek location in the streaming video. Displaying thumbnail images while a viewer scrubs to a desired location in a streaming video can assist the viewer in navigating to the desired location and thereby address the latency issues described above. However, such techniques break down for longer streaming videos, for example full-length movies, since scrubbing a timeline generally results in each individual pre-cached thumbnail image being displayed too quickly to be comprehensible and assist in navigation. Furthermore, shorter scenes in a long streaming video, for example scenes that are one or two minutes, can be so short that there is no pre-cached thumbnail image to be presented, thereby making navigation to such a scene using thumbnail images problematic.

As the foregoing illustrates, there is a need in the art for a more effective way to navigate videos.

SUMMARY OF THE INVENTION

One embodiment of the present invention sets forth a computer-implemented method for real-time scrubbing of a video. The method includes populating a two-dimensional array with representative images corresponding to a portion of the video and causing the two-dimensional array to be displayed. The two-dimensional array includes a location indicator configured to traverse the two-dimensional array in a direction parallel with one dimension of the two-dimensional array in response to navigation information associated with the portion of the video. The location indicator is further configured to indicate a position in the video by highlighting one of the representative images populating the two-dimensional array.

One advantage of the disclosed technique is that it enables fast and accurate navigation of a long-duration video. Because an end-user is provided with a large set of statically displayed thumbnails during navigation, the end-user can visually identify a desired target region, even when traversing a timeline relatively quickly. In addition, the potential for a scene being skipping during navigation is advantageously reduced.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

In the following description, numerous specific details are set forth to provide a more thorough understanding of the present invention. However, it will be apparent to one of skill in the art that the present invention may be practiced without one or more of these specific details.

Figure 1:
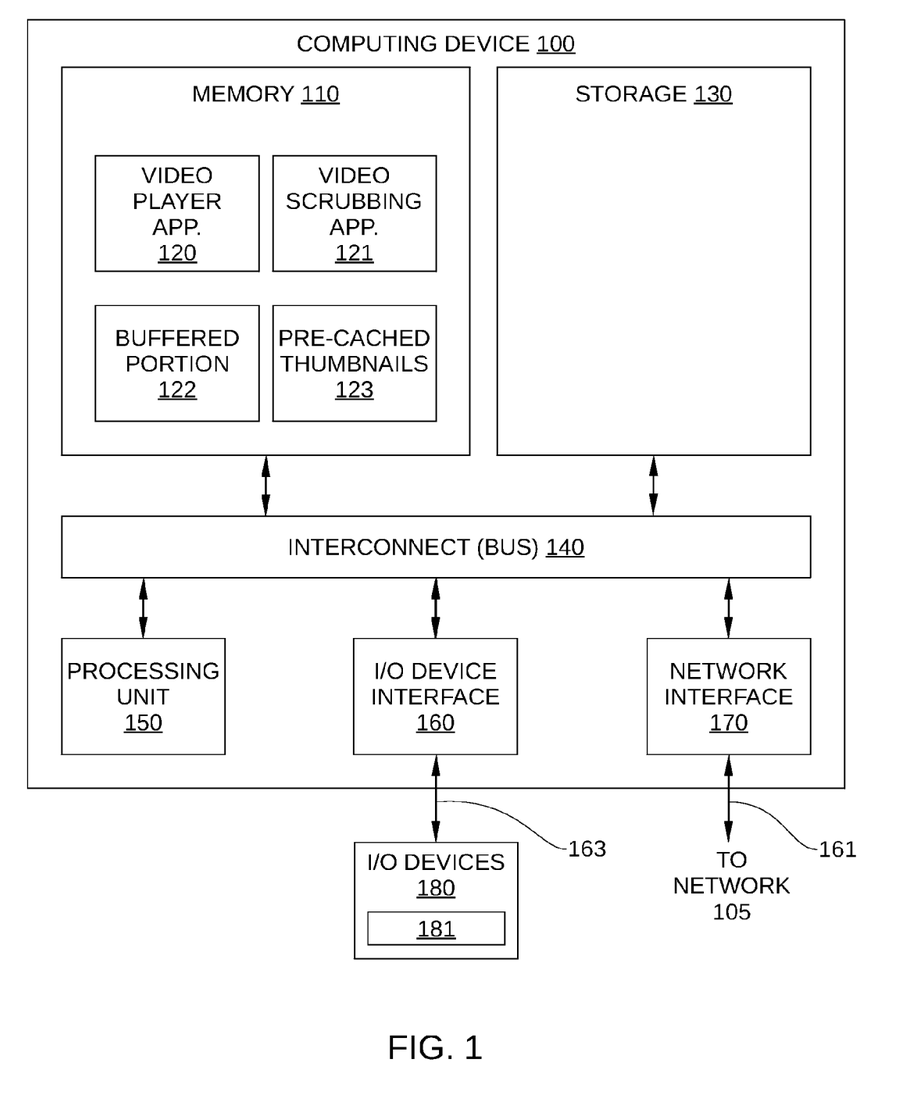
FIG. 1 is a block diagram of a computing device configured to implement one or more embodiments of the present invention.

FIG. 1 illustrates a computing device 100 configured to implement one or more aspects of the present invention. Computing device 100 may be a desktop computer, a laptop computer, a smart phone, a personal digital assistant (PDA), video game console, set top console, tablet computer, or any other type of computing device configured to receive input, process data, and display images, and is suitable for practicing one or more embodiments of the present invention. Computing device 100 is configured to run a video player application 120 and a video scrubbing application 121 that reside in a memory 110. Video player application 120, video scrubbing application 121, and memory 110 are described in detail below. In addition, computing device 100 is configured to receive input from an end-user and from a video streaming source, such as a network connection to the Internet or any other data network. Computing device 100 is further configured to display graphical images and/or video to the end-user via input/output (I/O) devices 180 (described below). It is noted that the computing device described herein is illustrative and that any other technically feasible configurations fall within the scope of the present invention.

As shown, computing device 100 includes an interconnect (bus) 140 that connects a processing unit 150, an input/output (I/O) device interface 160 coupled to input/output (I/O) devices 180, memory 110, a storage 130, and a network interface 170. Processing unit 150 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 150 may be any technically feasible hardware unit capable of processing data and/or executing software applications, including video player application 120 and video scrubbing application 121. Further, in the context of this disclosure, the computing elements shown in computing device 100 may correspond to a physical computing system (e.g., a system in a data center) or may be a virtual computing instance executing within a computing cloud.

I/O devices 180 may include devices capable of receiving input, such as a keyboard, a mouse, a video camera, a three-dimensional (3D) scanner, and so forth, as well as devices capable of providing output, such as a display device 181, a speaker, and so forth. Display device 181 may be a computer monitor, a video display screen, a display apparatus incorporated into a hand held device, or any other technically feasible display screen configured to present video media to an end-user. In some embodiments, display device 181 is a terminal window displayed on another display device, such as a video display window that has been opened by video player application 120. Additionally, I/O devices 180 may include devices capable of both receiving input and providing output, such as a touchscreen, a universal serial bus (USB) port, and so forth. I/O devices 180 may be configured to receive various types of input from an end-user of computing device 100, and to also provide various types of output to the end-user of computing device 100. In some embodiments, one or more of I/O devices 180 are configured to couple computing device 100 to a network 105.

Network 105 may be any technically feasible type of communications network that allows data to be exchanged between computing device 100 and external entities or devices, such as a video archive database or a provider of on-demand streaming media. For example, network 105 may include a wide area network (WAN), a local area network (LAN), a wireless (WiFi) network, and/or the Internet, among others.

Memory 110 may include a random access memory (RAM) module, a flash memory unit, or any other type of memory unit or combination thereof. Processing unit 150, I/O device interface 160, and network interface 170 are configured to read data from and write data to memory 110. Memory 110 includes various software programs that can be executed by processor 150 and application data associated with said software programs, including video player application 120, video scrubbing application 121, a buffered portion 122 of a streaming video being displayed by video player application 120, and a plurality of pre-cached thumbnails 123 associated with the video being displayed by video player application 120, as described in greater detail below. In other embodiments, video scrubbing application 121 resides on a server, and results of navigation, described below, are pushed to computing device 100, instead of being generated locally.

Storage 130 may be any technically feasible persistent storage device, such as a disk drive storage device, a solid-state storage device, or a combination of both. Although shown as a single unit, storage 130 may be a combination of fixed and/or removable storage devices, such as fixed disc drives, removable memory cards, or optical storage, network attached storage (NAS), or a storage area-network (SAN).

Video player application 120 may be any computer application or playback engine configured to play video content for an end-user on display device 181, and comprises program instructions that can be executed by processor 150. For example, video player application 120 may be a proprietary application provided to an end-user by a provider of on-demand streaming media and installed on computing device 100. Alternatively, video player application 120 may be a non-proprietary third-party application installed on computing device 100. The video content played by video player application 120 may be streaming video content received via network 105 or may be locally stored video content, e.g., fully buffered in memory 110, stored on nonvolatile media in storage 130, or read from a disk or other video storage medium.

Video player application 120 is configured to present streaming, i.e., un-cached, video content on display device 181, such video content being received by computing device 100 via network 105. In the embodiment illustrated in FIG. 1, such un-cached video content is depicted as a video 161. Generally, a small portion of video 161 is buffered by video player application 120 as buffered portion 122, except when navigation by an end-user takes place via video scrubbing application 121. When navigation by an end-user takes place via video scrubbing application 121, video player application 120 pauses until receiving a frame number, time code, or other navigation information 163 from video scrubbing application 121 that corresponds to a portion of video 161 selected by an end-user for viewing. Video player application 120 then buffers a suitable number of frames of video 161 and then presents video content starting at the desired frame number or time code.

Furthermore, in some embodiments, video player application 120 receives data from an end-user of computing device 100 via a keyboard, mouse, touch pad, and/or other suitable input devices, including a smart phone or digital tablet configured to communicate with computing device 100. Thus, a mouse, touch pad, or other input device can be used by an end-user as a navigation device to traverse from one location in video 161 to another while viewing video 161. Such navigation can be performed by changing the position of a pointer or cursor on a timeline slider (described below) associated with video 161, the position of the cursor being communicated to video scrubbing application 121 as navigation information 163.

Figure 2:
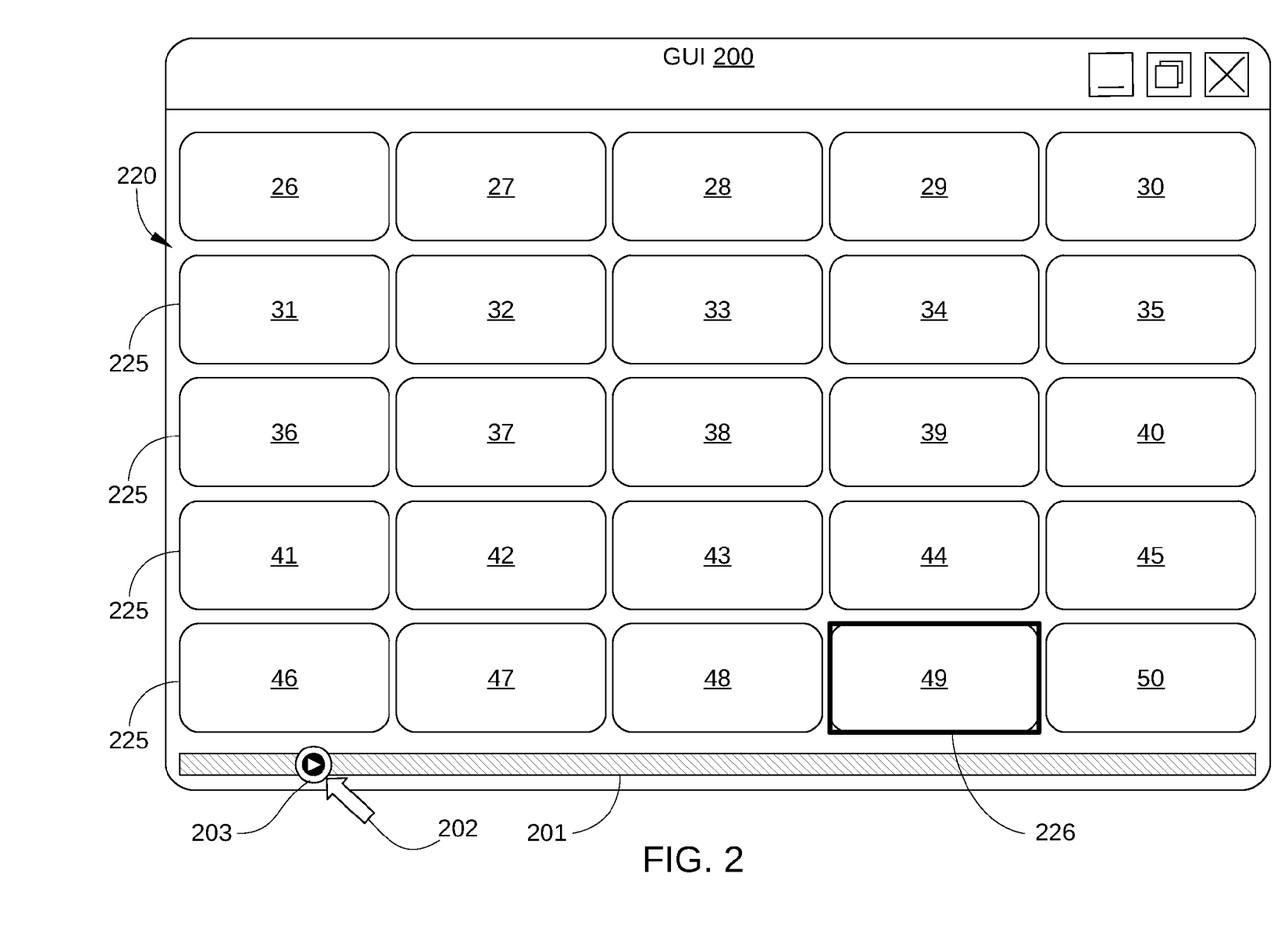
FIG. 2 is a conceptual illustration of a graphical user interface that includes a two-dimensional array of representative images for facilitating navigation of a video, according to one embodiment of the present invention.

Video scrubbing application 121 is a navigation engine that may be executed by processing unit 150 and is configured to facilitate navigation when viewing video content. In operation, embodiments of video scrubbing application 121 enhance real-time scrubbing of a video by displaying on display device 181 a two-dimensional array of representative images associated with a portion of the video. Specifically, the two-dimensional array of representative images corresponds to a portion of the video indicated by the current location of a position indicator on a timeline slider associated with the video. FIG. 2 illustrates a graphical user interface of one such embodiment of video scrubbing application 121.

FIG. 2 is a conceptual illustration of a graphical user interface 200 that includes a two-dimensional array of representative images for facilitating navigation of a video, according to one embodiment of the present invention. Video scrubbing application 121 causes graphical user interface (GUI) 200 to be displayed on display device 181 in response to a user activating a cursor or other selection device at some point on a timeline slider associated with a video, such as video 161. Video 161 may be a streaming video or a locally stored video. Display device 181 may be a conventional display screen or computer monitor on which GUI 200 is displayed. Alternatively, display device 181 may be a terminal window displayed on a portion of a display screen.

As shown, graphical user interface (GUI) 200 includes a timeline slider 201, a cursor 202, a playhead 203, and a two-dimensional array 220 of thumbnails 225 or other representative images, according to one embodiment of the present invention. Timeline slider 201, which may also be referred to as a track bar, is an object in GUI 200 with which a user may select a desired time value in a video by moving cursor 202. Cursor 202 is an indicator in GUI 200 that responds to position and other input from a human interface pointing device, such as a mouse or remote control device. For example, an end-user may utilize cursor 202 to activate timeline slider 201 and thenceforth traverse to a desired in location in a video on display device 181, such as video 161, by positioning playhead 203 on timeline slider 201. Playhead 203 is an object in GUI 200 that indicates what point in video 161 is currently selected for being displayed to an end-user on display device 181.

Two-dimensional array 220 includes a plurality of representative images, such as thumbnails 225, arranged in a grid pattern. In the embodiment illustrated in FIG. 1, two-dimensional array 220 is a 5×5 array of thumbnails 225 or other representative images, but any other two-dimensional array of representative images falls within the scope of the present invention, e.g., 8×8, 10×10, 9×12, etc. Each of thumbnails 225 is a representative image used in two-dimensional array 220 to represent a particular video frame of video 161, and is generally a down-scaled version of said frame and may have the same aspect ratio the frame. Alternatively, the thumbnails 225 or other representative images used in two-dimensional array 220 may have a different aspect ratio than that of a frame of video 161. For instance in order for two-dimensional array 220 to be displayed over a desired portion of display device 181 rather than all of display device 181, the aspect ratio of thumbnails 225 may be altered from that of a frame of video 161.

The thumbnails 225 or other representative images used in two-dimensional array 220 are chronologically arranged, either by row or by column. In FIG. 2, thumbnails 225 are arranged chronologically by row and, and for purposes of description are labeled 26-50 accordingly. Furthermore, the thumbnails 225 that are caused to be displayed at a particular time by video scrubbing application 121, i.e., thumbnails 26-50 in FIG. 1, correspond to frames of video 161 that occur proximate the time value on timeline slider 201 that equates to the current position of playhead 203 during navigation. In some embodiments, a location indicator is also included in two-dimensional array 220 to indicate which of thumbnails 225 corresponds to the current position of playhead 203. In FIG. 1, a highlighted border 226 is utilized as the location indicator in two-dimensional array 220, however any other highlighting technique or effect used as a location indicator falls within the scope of the present invention. For example, a location indicator in two-dimensional array 220 may include a flashing or otherwise animated element or border, a different-colored element or border, and/or a magnification effect that increases the size of the thumbnail 225 associated with the current location of playhead 203.

Generally, thumbnails 225 represent a small portion of the total number of frames making up video 161, the frames represented by thumbnails 225 being evenly spaced temporally throughout the duration of video 161. For example, when video 161 has a duration of 120 minutes and timeline slider 201 has a pixel width 210 of 854 pixels, associating a unique thumbnail 225 with each pixel of timeline slider 201 means that each of the 854 frames of video 161 that have a thumbnail 225 associated therewith are separated by approximately eight seconds. Thus, in this example, each thumbnail 225 corresponds to an eight-second portion of video 161.

Thumbnails 225 or other representative images utilized in two-dimensional array 220 may be downloaded to computing device 100 prior to and/or during the streaming of video 161. For example, in some embodiments, most or all of thumbnails 225 are downloaded and stored in memory 110 as buffered portion 122 of video 161 while video 161 starts up. Because thumbnails 225 are relatively low-resolution images and are generally associated with a small fraction of the total number of frames of video 161, thumbnails 225 can generally be downloaded quickly prior to the display of video 161.

When an end-user wants to navigate to a particular location in a video being displayed on display device 181, timeline slider 201 is activated by positioning cursor 202 on timeline slider 201 or a region of display device 181 associated with timeline slider 201. Playhead 203 is then positioned on timeline slider 201 with cursor 202, for example by holding a button on a controller, mouse, or other suitable input device, and dragged or "scrubbed" to a desired location on timeline slider 201. During such a navigation process, video scrubbing application 121 populates two-dimensional array 220 with thumbnails 225 that correspond to the current position of playhead 203 on timeline slider 201. As playhead 203 is positioned farther along timeline slider 201, a location indicator, such as highlighted border 226, is repositioned accordingly in two-dimensional array 220, thereby indicating at what frame video 161 will begin showing once navigation is paused or ended.

In some embodiments, once an end-user selects a particular thumbnail 225 that is displayed on display device 181, video scrubbing application 121 provides a frame number, time code, or other indexing information to video player application 120 indicating the point in video 161 selected by the end-user during navigation. When video 161 is a streaming video, video player application 120 then requests the appropriate frames of video 161 from the streaming video server, buffers a suitable number of frames of video 161, and snaps back to video 161 to display the selected video content. When video 161 is not a streaming video, video player application 120 snaps back to the referenced portion of video 161 to display the selected video content without the buffering process.

In some embodiments, an end-user may select the desired thumbnail 225 from two-dimensional array 220 by releasing the button on the input device. This approach is referred to as indirect frame selection mode. In other embodiments, the end-user may select the desired thumbnail 225 by moving cursor 202 onto two-dimensional array 220 and releasing the button of the input device when cursor 202 is positioned directly on the desired thumbnail, an approach referred to as direct frame selection mode. Direct frame selection mode facilitates selection of a particular thumbnail 225 in two-dimensional array 220, since pixel-perfect accuracy of cursor 202 movement along timeline slider 201 is not required. Instead, the much larger target of a desired thumbnail 225 is used to select a target scene. In one such embodiment, the transition from indirect selection mode to direct selection mode takes place when cursor 202 enters two-dimensional array 220 at an angle steeper than a predetermined angle with respect to timeline slider 201, for example 45° or more. In this way, an end-user is prevented from accidentally entering direct selection mode if cursor 202 drifts onto two-dimensional array 220.

In some embodiments, more than one thumbnail 225 can be associated with a single pixel of timeline slider 201. Such embodiments allow more total thumbnails 225 to be available and displayed during navigation of video 161. Thus, the total number of video frames or scenes that can be selected during navigation is not limited by the total number of pixels of timeline slider 201. In such embodiments, each thumbnail 225 can still be selected using direct selection mode when there is not a corresponding pixel of timeline slider 201 associated with a particular thumbnail 225.

In some embodiments, the dimensions of two-dimensional array 220 can be adjusted by video scrubbing application 121 based on various factors. In some embodiments, the dimensions of two-dimensional array 220 are varied as a function of the speed at which an end-user moves playhead 203 along timeline slider 201. For example, at very fast scrubbing speeds, two-dimensional array 220 can be expanded to include more total thumbnails 225, so that any individual thumbnail 225 remains displayed for a longer duration and the end-user can more easily recognize a desired scene. In other embodiments, the dimensions of two-dimensional array 220 are varied as a function of the overall duration of video 161. Since a very long video generally includes a proportionately large number of scenes, providing the end-user with the ability to see more thumbnails 225 at one time can facilitate scene selection. In some embodiments, the dimensions of two-dimensional array 220 are varied as a function of the general uniformity of thumbnails 225. For example, when the thumbnails 225 of video 161 are relatively uniform, such as when video 161 is a sporting event, the dimensions of two-dimensional array 220 may be reduced, so that more detail can be distinguished in each thumbnail 225 by the end-user. In some embodiments, the dimensions of two-dimensional array 220 are varied as a function of the actual size of display device 181. Specifically, when display device 181 is smaller, such as an embedded window on a webpage, the dimensions of two-dimensional array 220 may be reduced, for example to a 3×3 grid or a 4×4 grid, to ensure that each of thumbnails 225 is discernible to the end-user. Conversely, when display device 181 is relatively large, such as a 30-inch wide-screen display, the dimensions of two-dimensional array 220 may be increased, for example to a 10×10 grid or larger, since the absolute size of each thumbnail 225 is larger on a larger display device.

Because two-dimensional array 220 is displayed to an end-user during navigation of video 161, rather than a single thumbnail or a row of thumbnails, the end-user can more readily locate a desired scene or location when traversing video 161 quickly. This is because whole scenes can be inadvertently passed over by the end-user when quickly traversing a video and only a single navigation thumbnail or a small number of navigation thumbnails are displayed at one time during scrubbing. For instance, given a pixel width 210 of 854 pixels for timeline slider 201 and with a display updating at 30 frames/second, when an end-user traverses from the beginning to the end of timeline slider 201 in two seconds, only 60 of the 854 possible thumbnails 225 are displayed. Assuming the end-user traverses timeline slider 201 at a constant speed, so that the 60 frames are distributed evenly across timeline slider 201, 14 thumbnails 225 are skipped between each displayed thumbnail 225. For a 120-minute movie, 14 thumbnails 225 corresponds to a timespan of approximately 118 seconds. Thus, any visual segment of video 161 that is shorter than about two minutes in length may be easily skipped. Furthermore, the thumbnails 225 that actually are displayed during such a fast traverse will be flashed through so quickly that an end-user will invariably find them largely incomprehensible.

Two-dimensional array 220 allows a large number of thumbnails 225 to be displayed to an end-user at one time, e.g., 25, 36, etc., as playhead 203 is dragged along timeline slider 201. In this way, very few or none of the thumbnails associated with video 161 are passed over during navigation of video 161, even when an end-user scrubs very quickly along a timeline slider. In addition, two-dimensional array 220 can be statically displayed during navigation of video 161, and instead highlighted border 226 (or other location indicator) in two-dimensional array 220 moves chronologically through the thumbnails 225 that are currently being displayed, e.g., thumbnails 26-50 in FIG. 2. Visually, this approach greatly facilitates the navigation process at higher scrubbing speeds.

In contrast, according to some techniques known in the art, a one-dimensional array of thumbnails 225 is displayed during navigation, such as a row. As playhead 203 is dragged along timeline slider 201, the entire row may move across display device 181; upcoming thumbnails are added to one end of the row of displayed thumbnails and thumbnails that have been navigated past are eliminated from the opposite end of the row of displayed thumbnails. While this approach allows a larger number of thumbnails to be displayed during navigation, e.g., five or ten, at higher scrubbing speeds the motion of the entire one-dimensional display of thumbnails is visually disorienting and fails to facilitate navigation. Alternatively, such a one-dimensional array of thumbnails can remain static as playhead 203 is dragged along timeline slider 201, and is updated with an entire group of new thumbnails only when the end of the one-dimensional array is reached. Because such an approach allows only a relatively small number of thumbnails to be displayed at a time, at higher scrubbing speeds the row is generally updated so quickly that the one-dimensional array does not visually assist navigation by the end-user.

Generally there are many more thumbnails 225 available to be displayed during navigation of a particular video 161 than can be accommodated by two-dimensional array 220. Consequently, as playhead 203 is dragged along timeline slider 201 by an end-user, video scrubbing application 121 causes two-dimensional array 220 to be updated accordingly with new thumbnails 225. In other words, two-dimensional array 220 scrolls through the available thumbnails 225 during navigation. In some embodiments, video scrubbing application 161 applies one of various scrolling methods to two-dimensional array 220, including page-at-time scrolling, row-at-a-time scrolling, and continuous scrolling, each of which is described below.

FIGS. 3A-3D conceptually illustrate page-at-a-time scrolling of two-dimensional array 220 shown in FIG. 2, according to one embodiment of the present invention. In page-at-a-time scrolling, as playhead 203 is moved forward on timeline slider 201 (i.e., from left to right), a location indicator highlights a thumbnail corresponding to the current location of playhead 203 and moves left-to-right and top-to-bottom until the location indicator reaches the bottom right-hand corner of two-dimensional array 220. When playhead 203 moves further to the left on timeline slider 203, two-dimensional array 220 is then updated with the next group of thumbnails 225 corresponding to the current location of playhead 203.

Figure 3A:
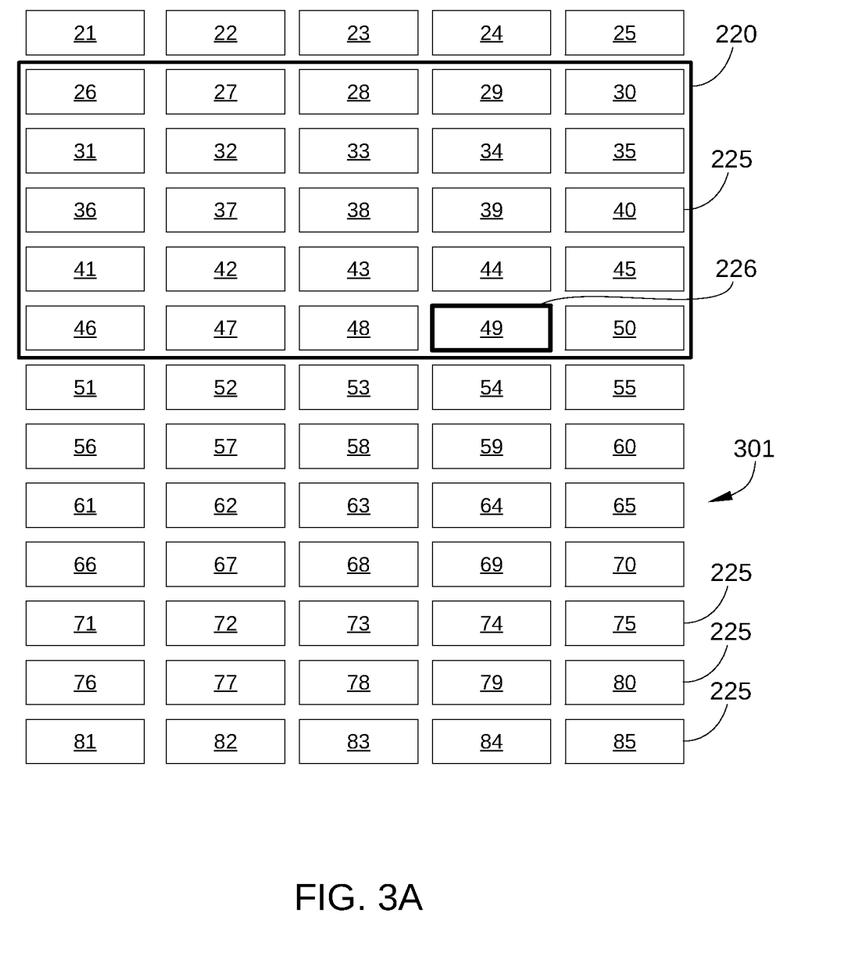
FIGS. 3A-3D conceptually illustrate page-at-a-time scrolling of the two-dimensional array of representative images shown in FIG. 2, according to one embodiment of the invention.

FIG. 3A schematically depicts two-dimensional array 220 superimposed on an array 301 of all thumbnails 225 that are available for display during navigation of video 161. For example, when video 161 is 120 minutes in length and the period of time selected to separate each of thumbnails 225 is approximately eight seconds, the total number of thumbnails in array 301 is 900. As shown, highlighted border 226, which indicates the thumbnail that currently corresponds to the location of playhead 203 (not shown in FIGS. 3A-3D) is located at thumbnail 49.

Figure 3B:
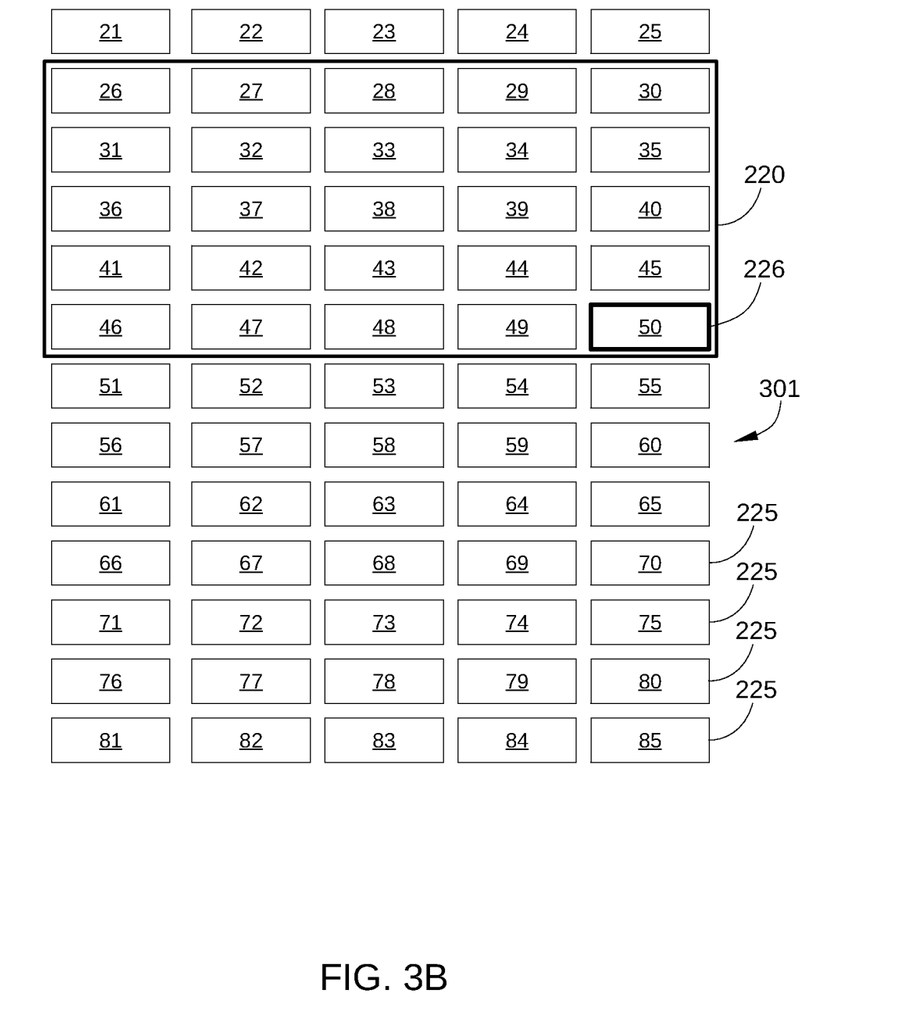
Figure 3C:
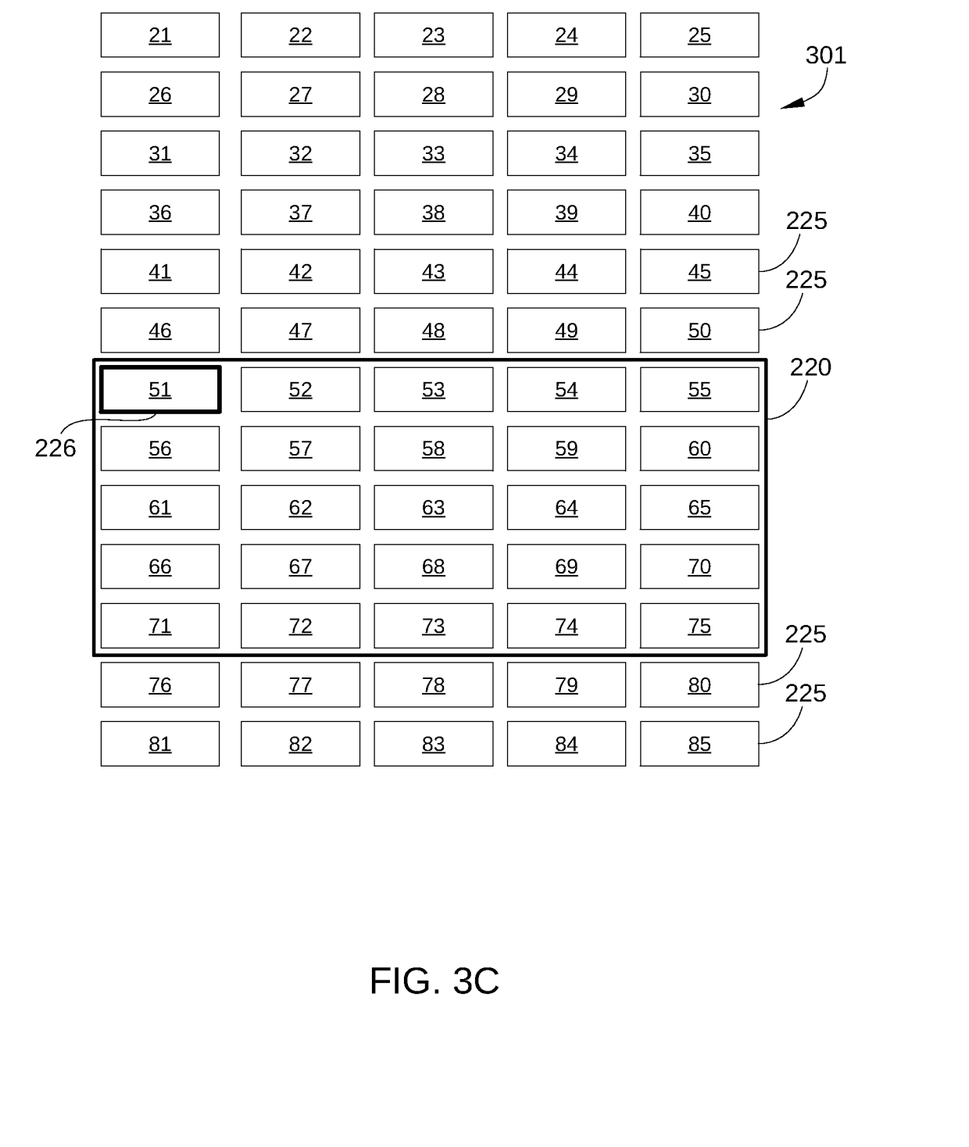
Figure 3D:
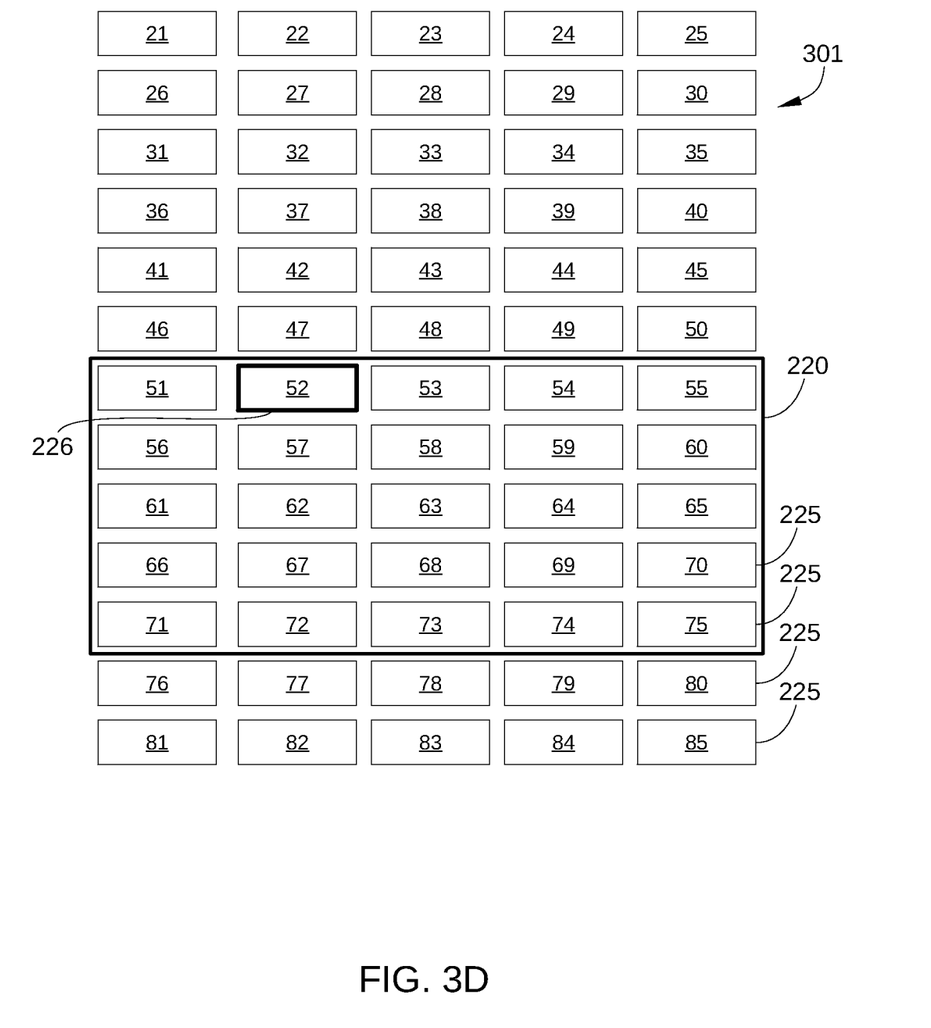

In FIG. 3B, playhead 203 is moved by an end-user and, in response, highlighted border 226 moves forward to thumbnail 50. However, two-dimensional array 220 does not move with respect to array 301, since thumbnail 50 is currently within two-dimensional array 220. In FIG. 3C, playhead 203 is again moved by the end-user and, in response, highlighted border 226 moves forward to thumbnail 51. Because thumbnail 51 falls outside of the current position of two-dimensional array 220, two-dimensional array 220 scrolls forward along array 301, which in FIGS. 3A-3D is depicted as downward. Thus, in FIG. 3C, two-dimensional array 220 includes thumbnails 51-75 as shown and highlighted border 226 is positioned on thumbnail 51 in the upper left-hand corner of two-dimensional array 220. It is noted that none of thumbnails 51-75 overlap with the previously displayed thumbnails 26-50. In FIG. 3D, playhead 203 is again moved by the end-user and, in response, highlighted border 226 moves forward to thumbnail 52. Because thumbnail 52 is currently within two-dimensional array 220, two-dimensional array 220 does not move with respect to array 301.

In the embodiment illustrated in FIGS. 3A-3D, two-dimensional array 220 scrolls forward on a page-at-a-time basis with respect to array 301. Because in such an embodiment a large number of thumbnails are displayed to the end-user during navigation of video 161, the likelihood that thumbnails are passed over by the end-user is greatly reduced. Furthermore, since the thumbnails 225 are statically displayed in two-dimensional array 220 until highlighted border 226 is moved to the next block of thumbnails in array 301, an end-user can more easily determine which thumbnails is closest to a desired location in video 161.

FIGS. 4A-4D conceptually illustrate row-at-a-time scrolling of two-dimensional array 220 shown in FIG. 2, according to one embodiment of the present invention. In row-at-a-time scrolling, two-dimensional array 220 provides a static view of thumbnails 225 while a location indicator highlights a thumbnail and moves within a single row of two-dimensional array 220. Thus, as playhead 203 is moved forward on timeline slider 201, the location indicator highlights a thumbnail corresponding to the current location of playhead 203 and moves left-to-right in a particular row of two-dimensional array 220, such as center row 227. When playhead 203 moves further to the left on timeline slider 203, two-dimensional array 220 scrolls forward and is updated with a new row of thumbnails.

Figure 4A:
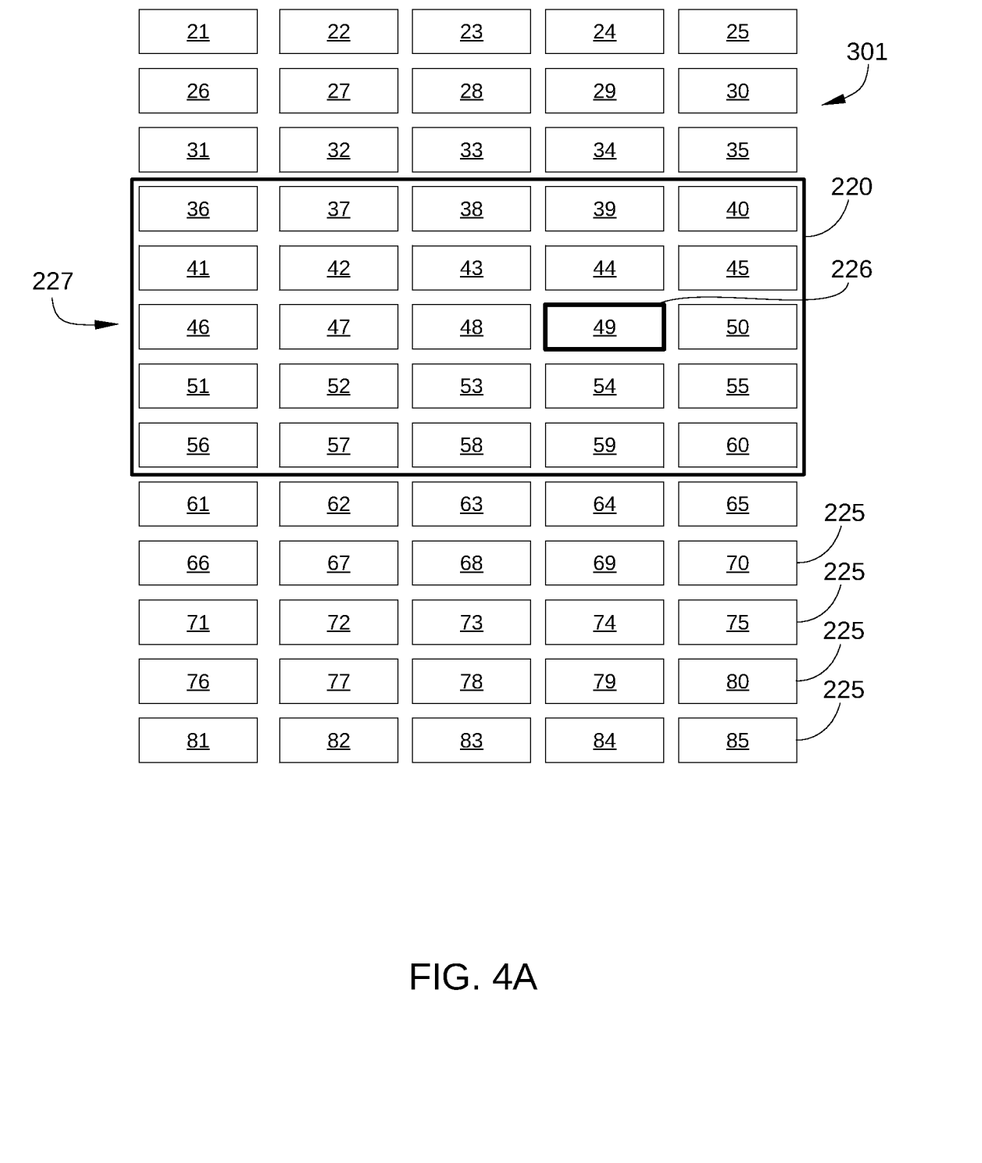
FIGS. 4A-4D conceptually illustrate row-at-a-time scrolling of the two-dimensional array of representative images shown in FIG. 2, according to one embodiment of the invention.
Figure 4B:
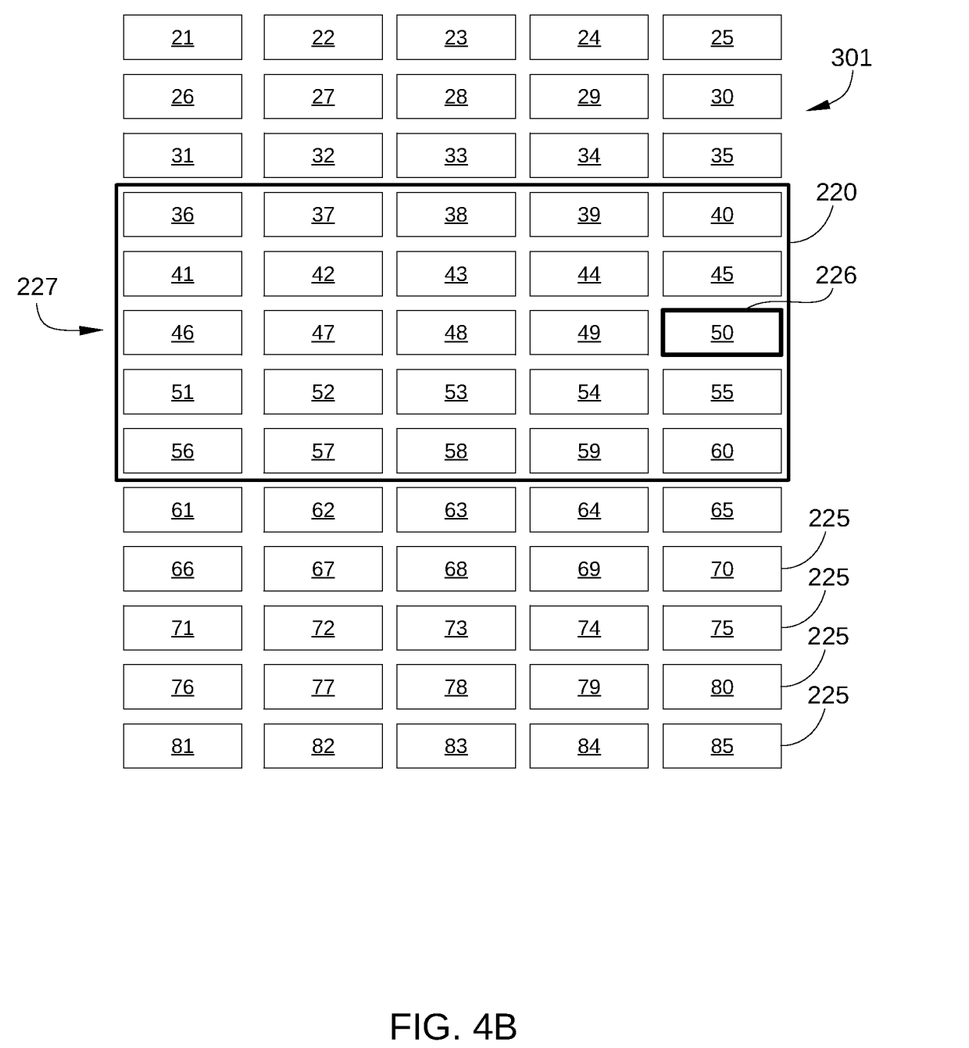
Figure 4C:
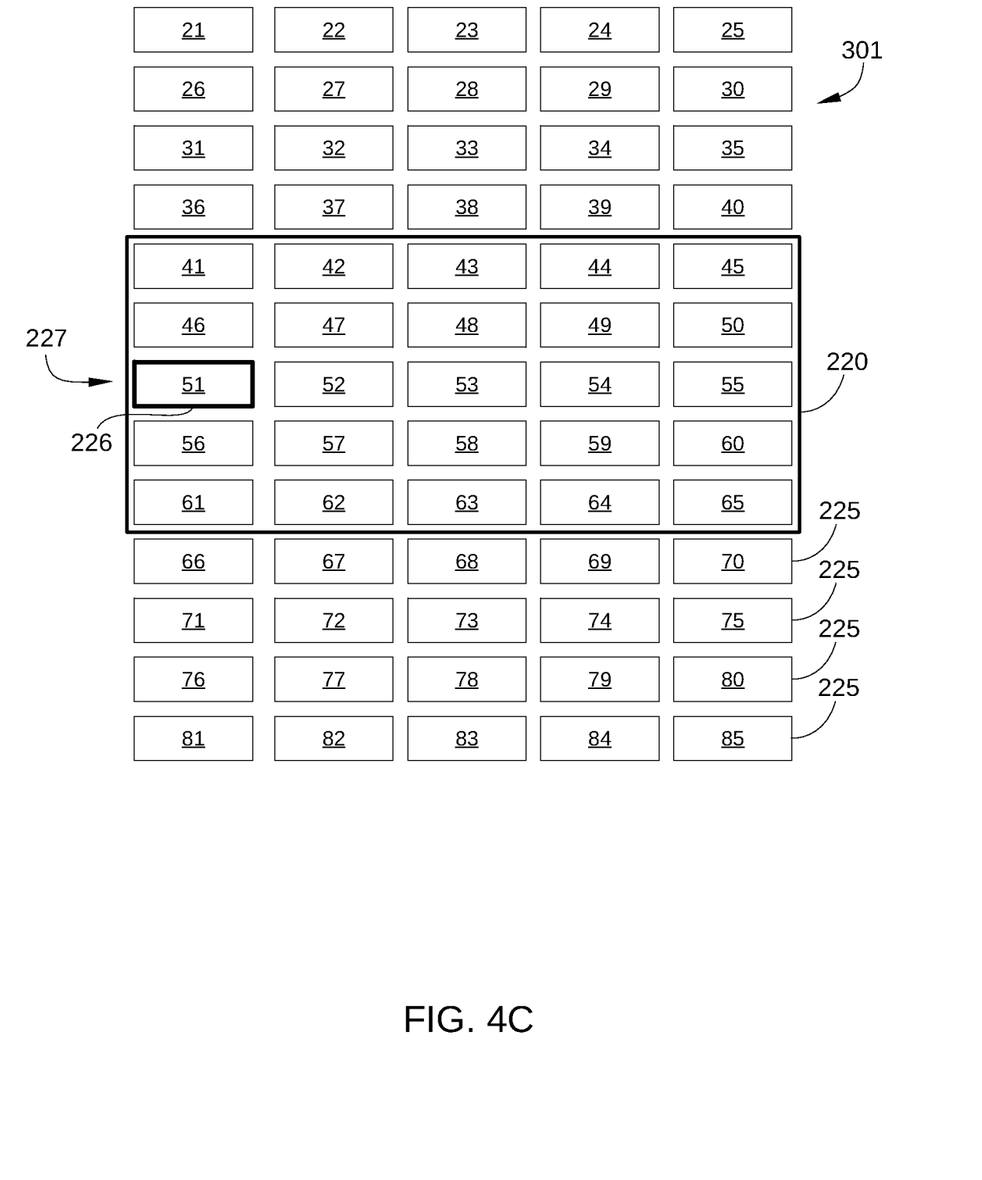
Figure 4D:
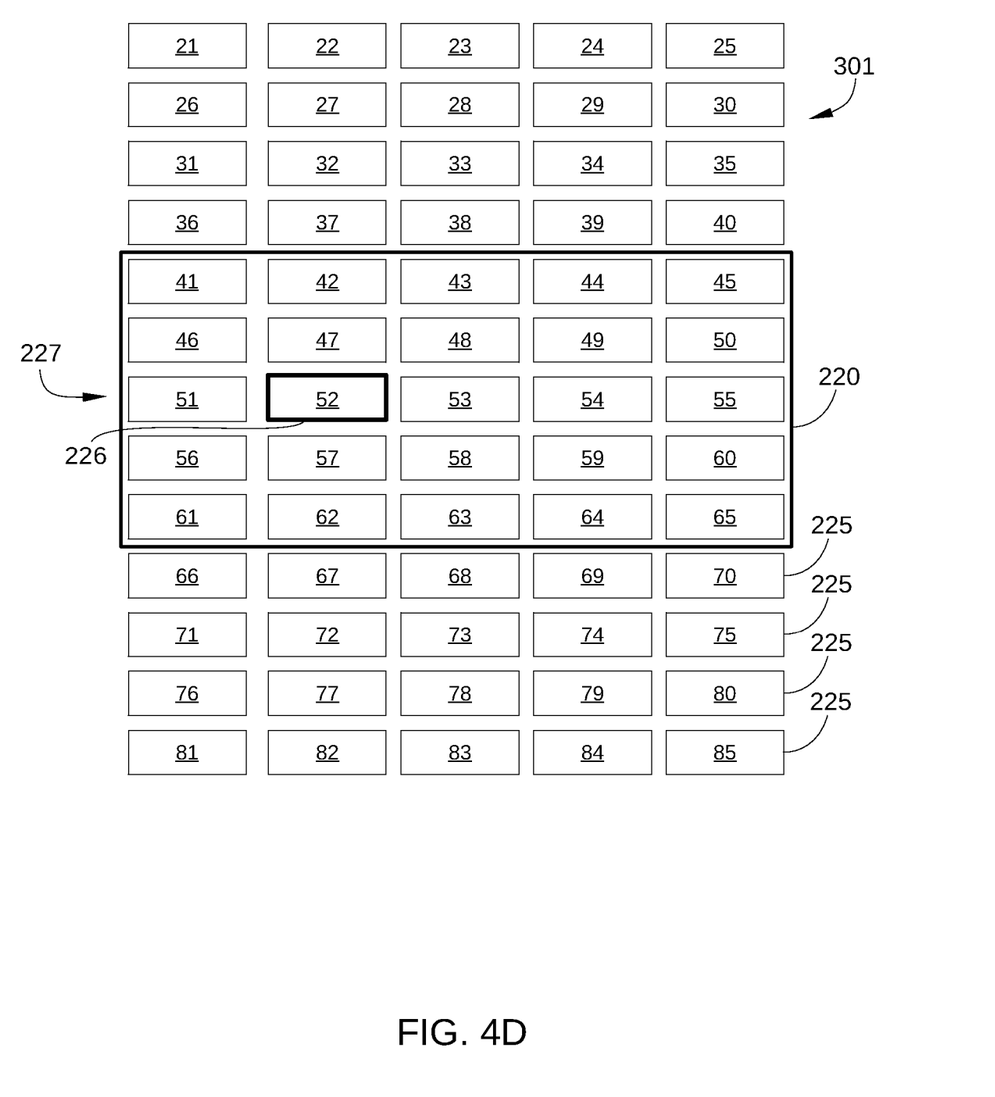

FIG. 4A schematically depicts two-dimensional array 220 superimposed on array 301 of all thumbnails 225 that are available for display during navigation of video 161. As shown, highlighted border 226 is positioned on thumbnail 49, which is located in center row 227, and two-dimensional array 220 includes thumbnails 36-60. In FIG. 4B, playhead 203 is moved by an end-user and, in response, highlighted border 226 moves forward to thumbnail 50. Because thumbnail 50 is currently within center row 227, two-dimensional array 220 does not move with respect to array 301. In FIG. 4C, playhead 203 is again moved by the end-user and, in response, highlighted border 226 moves forward to thumbnail 51. Because thumbnail 51 falls outside of center row 27, two-dimensional array 220 scrolls forward along array 301 by one row, which in FIGS. 4A-4D is depicted as downward. Thus, in FIG. 4C, two-dimensional array 220 displays thumbnails 41-65 as shown and highlighted border 226 is positioned on thumbnail 51 in the left-hand position of center row 227. In FIG. 4D, playhead 203 is again moved by the end-user and, in response, highlighted border 226 moves forward to thumbnail 52. Because thumbnail 52 is currently within center row 27, two-dimensional array 220 does not move with respect to array 301.

In some embodiments, when two-dimensional array 220 scrolls forward along array 301, the scrolling action is animated to present a visually smooth transition. In other words, rather than instantly changing what thumbnails are displayed in two-dimensional array 220, the transition takes place in a less visually disorienting fashion. For instance, in row-at-a-time scrolling, when two-dimensional array 220 scrolls forward along array 301 by one row in response to movement of playhead 203 on timeline slider 201, the thumbnails displayed in two-dimensional array 200 slide upward one row when the highlighted thumbnail reaches the end of center row 227. Thus, in one example, video scrubbing application 121 causes thumbnails 36-60 to smoothly transition upward one row of array 301 so that thumbnails 41-65 are instead displayed in two-dimensional array 220. Such embodiments can be applied to page-at-a-time scrolling or row-at-a-time scrolling. Furthermore, in some embodiments, such smoothly transitioning scrolling from one row to the next of array 301 can be performed continuously. Thus, as the highlighted thumbnail in two-dimensional array 220 is moved across center row 227, two-dimensional array 220 continuously transitions downward one row of array 301. Such embodiments are referred to as continuous scrolling.

While page-at-a-time, row-at-a-time, and continuous scrolling are described above based on the assumption that left-to-right and top-to-bottom correspond to moving playhead 203 forward along timeline slider 201, any direction can be used for scrolling of two-dimensional array with respect to array 301 and still fall within the scope of the present invention. For example, row-at-a-time scrolling can instead be carried out as "column-at-a-time" scrolling, where a location indicator such as highlighted border 226 is moved from top-to-bottom in a column of two-dimensional array 220. Similarly, page-at-a-time scrolling may be based on horizontal scrolling of two-dimensional array 220 with respect to array 301.

Figure 5:
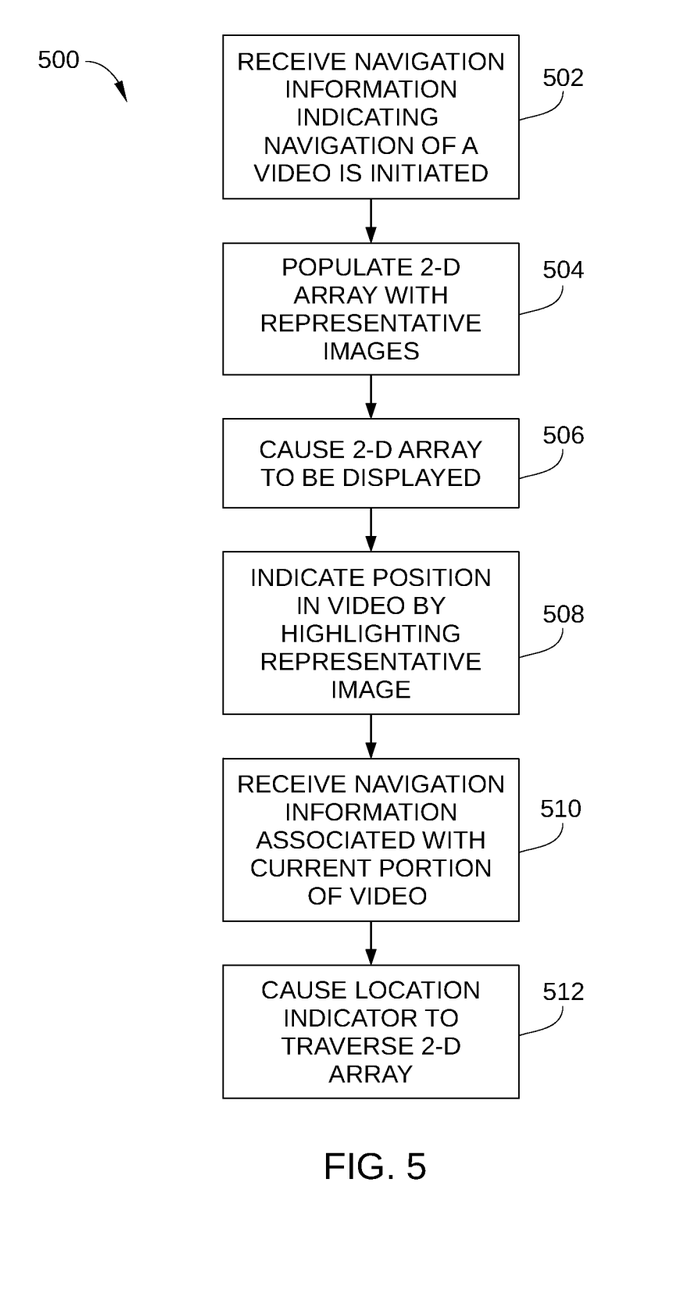
FIG. 5 is a flowchart of method steps for traversing a video file, according to one embodiment of the present invention.

FIG. 5 is a flowchart of method steps for traversing a video file, according to one embodiment of the present invention. Although the method steps are described in conjunction with the system of FIG. 1, persons skilled in the art will understand that any system configured to perform the method steps, in any order, is within the scope of the present invention.

Prior to beginning method 500, computing device 100 receives some or all thumbnails 225 associated with video 161 and buffers thumbnails 225 as pre-cached thumbnails 123. In some embodiments, all of thumbnails 225 are buffered prior to method 500, and in other embodiments, some or all of thumbnails 225 are buffered while video 161 is caused to be displayed by video player application 120.

As shown, the method 500 begins at step 502, where video scrubbing application 121 receives navigation information indicating that an end-user has initiated navigation of a video. For example, an end-user may use one of I/O devices 180 to move cursor 202 onto timeline slider 201 on display device 181.

In step 504, in response to receiving the navigation information in step 502, video scrubbing application 121 populates two-dimensional array 220 with representative images, such as thumbnails 225. The thumbnails 225 used to populate two-dimensional array 220 correspond to a portion of video 161 associated with a location in video 161 indicated by the navigation information. For example, when two-dimensional array 220 is a 5×5 array, and each of the representation images therein corresponds to approximately 10 seconds of video 161, the portion of video 161 associated with a location in video 161 indicated by the navigation information is a 250 second segment of video 161. Two-dimensional array 220 includes a location indicator, such as highlighted border 226, which is positioned in two-dimensional array 220 to indicate a thumbnail 225 corresponding to the current position of playhead 203 on timeline slider 201.

In step 506, video scrubbing application 121 causes two-dimensional array 220 to be displayed on display device 181.

In step 508, video scrubbing application 121 indicates a position in video 161 by highlighting one of the representative images that populate displayed two-dimensional array 220 using the location indicator, such as highlighted border 226. In some embodiments, steps 506 and 508 may occur concurrently.

In step 510 video scrubbing application 121 receives navigation information associated with the current portion of video 161, i.e., the portion of video 161 indicated by the navigation information received in step 502. For example, as an end-user drags cursor 202 along timeline slider 201 to reposition playhead 203, navigation information generated by the cursor-dragging is received by video scrubbing application 121.

In step 512, in response to the navigation information received in step 510, video scrubbing application 121 causes the location indicator as displayed on display device 181 to traverse two-dimensional array 220 in a direction parallel with one dimension of the two-dimensional array, for example horizontally. The traverse is performed in one direction when the navigation information indicates that playhead 203 is being moved forward along timeline slider 201 and in an opposite direction when playhead 203 is being moved backward along timeline slider 201. The location indicator may also perform further traversing operations based on navigation information received subsequent to step 510.

Various embodiments of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state nonvolatile semiconductor memory) on which information is permanently stored; and (ii) writable storage media (e.g., floppy disks within a diskette drive or hard-disk drive or any type of solid-state random-access semiconductor memory) on which alterable information is stored.

In sum, embodiments of the present invention provide a two-dimensional array of representative images for facilitating navigation of a video, such as a streaming video, by an end-user. Because an end-user is provided with a large set of statically displayed representative images during navigation of a video timeline, the end-user can visually identify a desired target scene, even when traversing the timeline relatively quickly.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method for traversing a video file, the method comprising:
   downloading a plurality of representative images associated with the video file prior to streaming the video file, wherein each representative image included in the plurality of representative images corresponds to a portion of the video file;
   populating a two-dimensional array with at least a portion of the plurality of representative images, wherein the two-dimensional array includes a location indicator;
   causing the two-dimensional array to be displayed to a user;
   indicating a position in the video file by highlighting one of the representative images populating the displayed two-dimensional array with the location indicator; and
   in response to receiving navigation information associated with a first portion of the video file, causing the location indicator to traverse the two-dimensional array in a direction parallel with one dimension of the two-dimensional array.

2. The method of claim 1, wherein each representative image corresponds to a plurality of frames of the video.

3. The method of claim 1, further comprising receiving user-selection information, identifying a first representative image based on the user-selection information, and navigating to a portion of the video file that corresponds to the first representative image.

4. The method of claim 1, wherein causing the location indicator to traverse the two-dimensional array in the direction parallel with one dimension of the two-dimensional array comprises causing the two-dimensional array to be displayed statically while the location indicator traverses the two-dimensional array in the direction parallel with one dimension of the two-dimensional array.

5. The method of claim 1, wherein the dimensions of the two-dimensional array are based on at least one of a scrolling speed included in the navigation information; a duration of the video file; a size of a display device on which the two-dimensional array is displayed; and a uniformity of the representative images.

6. The method of claim 1, wherein the number of representative images associated with the video file is based on a pixel length of a timeline slider associated with the video file.

7. The method of claim 6, wherein multiple representative images are associated with a single pixel of the timeline slider associated with the video file.

8. The method of claim 1, further comprising, upon receiving user navigation information indicating user navigation from the first portion of the video file to a second portion of the video file:
  populating a second two-dimensional array with representative images each corresponding to the second portion of the video file; and
  causing the second two-dimensional array to be displayed to the user.

9. The method of claim 8, wherein the first portion of the video file and the second portion of the video file overlap.

10. The method of claim 8, wherein the first portion of the video file and the second portion of the video file do not overlap.

11. The method of claim 1, wherein the dimensions of the two-dimensional array are based on a uniformity of the representative images.

12. A non-transitory computer readable medium storing instructions that, when executed by a processor, cause the processor to traverse a video file, by performing the steps of:
  downloading a plurality of representative images associated with the video the prior to streaming the video file, wherein each representative image included in the plurality of representative images corresponds to a portion of the video file:
  populating a two-dimensional array with at least a portion of the plurality of representative images, wherein the two-dimensional array includes a location indicator;
  causing the two-dimensional array to be displayed to a user;
  indicating a position in the video file by highlighting one of the representative images populating the displayed two-dimensional array with the location indicator; and
  in response to receiving navigation information associated with a first portion of the video file, causing the location indicator to traverse the two-dimensional array in a direction parallel with one dimension of the two-dimensional array.

13. The computer readable medium of claim 12, wherein each representative image corresponds to a plurality of frames of the video file.

14. The computer readable medium of claim 12, further comprising instructions that, when executed by a processor, cause the processor to traverse the video file by receiving user-selection information, identifying a first representative image based on the user-selection information, and navigating to a portion of the video file that corresponds to the first representative image.

15. The computer readable medium of claim 12, wherein causing the location indicator to traverse the two-dimensional array in the direction parallel with one dimension of the two-dimensional array comprises causing the two-dimensional array to be displayed statically while the location indicator traverses the two-dimensional array in the direction parallel with one dimension of the two-dimensional array.

16. The computer readable medium of claim 12, wherein the dimensions of the two-dimensional array are based on at least one of a scrolling speed included in the navigation information; a duration of the video file; a size of a display device on which the two-dimensional array is displayed; and a uniformity of the representative images.

17. The computer readable medium of claim 12, wherein the number of representative images associated with the video file is based on a pixel length of a timeline slider associated with the video.

18. The computer readable medium of claim 17, wherein multiple representative images are associated with a single pixel of the timeline slider associated with the video file.

19. The computer readable medium of claim 12, further comprising instructions that, when executed by a processor, cause the processor to traverse the video file by, upon receiving user navigation information indicating user navigation from the first portion of the video file to a second portion of the video file:
  populating a second two-dimensional array with representative images each corresponding to the second portion of the video file; and
  causing the second two-dimensional array to be displayed to the user.

20. The computer readable medium of claim 19, wherein the first portion of the video file and the second portion of the video file overlap.

21. The computer readable medium of claim 19, wherein the first portion of the video file and the second portion of the video file do not overlap.

* * * * *

UNITED STATES PATENT AND TRADEMARK OFFICE
CERTIFICATE OF CORRECTION

PATENT NO. : 9,736,526 B2  
APPLICATION NO. : 13/860412  
DATED : August 15, 2017  
INVENTOR(S) : Justin Frank Matejka, Tovi Grossman and George Fitzmaurice Page 1 of 1

It is certified that error appears in the above-identified patent and that said Letters Patent is hereby corrected as shown below:

In the Claims

Column 13, Claim 12, Line 48, please delete "video the" and insert --video file--.

Signed and Sealed this  
Twenty-first Day of November, 2017

Joseph Matal  
*Performing the Functions and Duties of the*  
*Under Secretary of Commerce for Intellectual Property and*  
*Director of the United States Patent and Trademark Office*